United States Patent
Friedlander et al.

(10) Patent No.: US 9,697,240 B2
(45) Date of Patent: Jul. 4, 2017

(54) CONTEXTUAL STATE OF CHANGED DATA STRUCTURES

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US); Harold L. Ossher, South Salem, NY (US); David M. Ungar, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 14/051,565

(22) Filed: Oct. 11, 2013

(65) Prior Publication Data
US 2015/0106408 A1  Apr. 16, 2015

(51) Int. Cl.
G06F 17/30 (2006.01)

(52) U.S. Cl.
CPC .............................. *G06F 17/30312* (2013.01)

(58) Field of Classification Search
CPC ................................................ G06F 17/30312
See application file for complete search history.

(56) References Cited

U.S. PATENT DOCUMENTS

| | | | |
|---|---|---|---|
| 5,664,179 A | 9/1997 | Tucker | |
| 5,689,620 A | 11/1997 | Kopec et al. | |
| 5,701,460 A | 12/1997 | Kaplan et al. | |
| 5,893,117 A | 4/1999 | Wang et al. | |
| 6,314,555 B1 | 11/2001 | Ndumu et al. | |
| 6,633,868 B1 | 10/2003 | Min et al. | |
| 6,980,908 B2 * | 12/2005 | McKewon | G01W 1/10 702/3 |
| 7,058,628 B1 | 6/2006 | Page | |
| 7,337,174 B1 | 2/2008 | Craig | |
| 7,441,264 B2 | 10/2008 | Himmel et al. | |
| 7,447,667 B2 | 11/2008 | Gong et al. | |
| 7,477,165 B2 | 1/2009 | Fux et al. | |
| 7,503,007 B2 | 3/2009 | Goodman et al. | |
| 7,679,534 B2 | 3/2010 | Kay et al. | |
| 7,684,994 B2 * | 3/2010 | Kodger, Jr. | G06Q 10/025 235/375 |
| 7,778,955 B2 | 8/2010 | Kuji | |

(Continued)

OTHER PUBLICATIONS

U.S. Appl. No. 13/592,905—Notice of Allowance mailed Oct. 25, 2013.

(Continued)

Primary Examiner — Kristopher Andersen
(74) Attorney, Agent, or Firm — Law Office of Jim Boice

(57) ABSTRACT

A method, system, and/or computer program product associates new contextual state information about a changed data structure with a beneficial target data. Event data, which describes an event that modifies a data structure, is incorporated into the data structure to create a changed data structure state. New contextual state information, which describes the changed data structure state, is generated and transmitted to multiple beneficial target data stores, wherein applying the new contextual state information to a particular beneficial target data affects an activity that utilizes the particular beneficial target data.

16 Claims, 5 Drawing Sheets

(56) References Cited

U.S. PATENT DOCUMENTS

| | | | |
|---|---|---|---|
| 7,870,113 B2 | 1/2011 | Gruenwald | |
| 7,877,682 B2 | 1/2011 | Aegerter | |
| 8,055,603 B2 | 11/2011 | Angell et al. | |
| 8,069,188 B2 | 11/2011 | Larson et al. | |
| 8,145,582 B2 | 3/2012 | Angell et al. | |
| 8,155,382 B2 | 4/2012 | Rubenstein | |
| 8,161,048 B2 | 4/2012 | Procopiuc et al. | |
| 8,463,790 B1* | 6/2013 | Joshi | G06F 17/30011 707/738 |
| 2002/0184401 A1* | 12/2002 | Kadel, Jr. | G06F 8/76 719/315 |
| 2004/0162838 A1 | 8/2004 | Murayama et al. | |
| 2006/0004851 A1 | 1/2006 | Gold et al. | |
| 2006/0136513 A1 | 6/2006 | Ngo et al. | |
| 2007/0006321 A1 | 1/2007 | Bantz et al. | |
| 2007/0185850 A1 | 8/2007 | Walters et al. | |
| 2008/0208838 A1 | 8/2008 | Friedlander et al. | |
| 2008/0208901 A1 | 8/2008 | Friedlander et al. | |
| 2008/0281801 A1 | 11/2008 | Larson et al. | |
| 2008/0306926 A1 | 12/2008 | Friedlander et al. | |
| 2009/0037451 A1 | 2/2009 | Borrill | |
| 2009/0165110 A1 | 6/2009 | Becker et al. | |
| 2009/0299988 A1 | 12/2009 | Hamilton, II et al. | |
| 2010/0083230 A1 | 4/2010 | Ramakrishnan et al. | |
| 2010/0125604 A1 | 5/2010 | Martinez et al. | |
| 2010/0125605 A1 | 5/2010 | Nair et al. | |
| 2010/0131293 A1 | 5/2010 | Linthicum et al. | |
| 2010/0191743 A1 | 7/2010 | Perronnin et al. | |
| 2010/0241644 A1 | 9/2010 | Jackson et al. | |
| 2010/0274785 A1 | 10/2010 | Procopiuc et al. | |
| 2011/0040724 A1 | 2/2011 | Dircz | |
| 2011/0087678 A1 | 4/2011 | Frieden et al. | |
| 2011/0099477 A1 | 4/2011 | Talaat | |
| 2011/0137882 A1 | 6/2011 | Weerasinghe | |
| 2011/0246498 A1 | 10/2011 | Forster | |
| 2012/0023141 A1 | 1/2012 | Holster | |
| 2012/0203756 A1 | 8/2012 | Biran et al. | |
| 2012/0221439 A1 | 8/2012 | Sundaresan et al. | |
| 2012/0239761 A1 | 9/2012 | Linner et al. | |
| 2012/0240080 A1 | 9/2012 | O'Malley | |
| 2012/0290950 A1 | 11/2012 | Rapaport et al. | |
| 2013/0060696 A1 | 3/2013 | Martin et al. | |
| 2013/0173585 A1 | 7/2013 | Friedlander et al. | |
| 2013/0339379 A1 | 12/2013 | Ferrari et al. | |
| 2014/0095425 A1* | 4/2014 | Sipple | G06N 7/005 706/52 |
| 2014/0250111 A1 | 9/2014 | Morton et al. | |

OTHER PUBLICATIONS

U.S. Appl. No. 13/621,931—Non-Final Office Action mailed Jan. 28, 2015.
U.S. Appl. No. 13/628,853—Non-Final Office Action mailed Nov. 7, 2013.
U.S. Appl. No. 13/628,853—Notice of Allowance mailed Mar. 4, 2014.
E. Pitoura, et al., "Context in Databases", University of Ioannina, Greece, 2004, pp. 1-19.
R. Angles et al., "Survey of Graph Database Models", ACM Computing Surveys, vol. 40, No. 1, Article 1, Feb. 2008, pp. 1-65.
U.S. Appl. No. 14/030,544—Specification and Drawings Filed Sep. 18, 2013.
U.S. Appl. No. 13/592,905—Specification and Drawings Filed Aug. 23, 2012.
U.S. Appl. No. 13/592,905—Non-Final Office Action Mailed May 8, 2013.
J. Cheng et al., "Context-Aware Object Connection Discovery in Large Graphs", Data Engineering, 2009. ICDE '09. IEEE 25th International Conference on, pp. 856-867.
U.S. Appl. No. 13/610,347—Specification and Drawings Filed Sep. 11, 2012.
U.S. Appl. No. 13/610,347—Non-Final Office Action Mailed Jul. 19, 2013.
U.S. Appl. No. 13/610,347—Notice of Allowance Mailed Aug. 19, 2013.
U.S. Appl. No. 13/610,523—Specification and Drawings Filed Sep. 11, 2012.
U.S. Appl. No. 13/621,931—Specification and Drawings Filed Sep. 18, 2012.
U.S. Appl. No. 13/628,853—Specification and Drawings Filed Sep. 27, 2012.
M. Easterfield et al., "Technical Paper No. 4—Verion Management in GIS—Applications and Techniques", retrieved Oct. 2, 2013, from http://www.geo.hunter.cuny.edu/~rdatta/gis2/abstracts/paper/Technical_paper_4.pdf, 2006, pp. 1-11.
C. Parent et al., "The Murmur Project: Modeling and Querying Multi-Representation Spatio-Temporal Databases", Elsevier Science Ltd. Oxford, UK, Journal Information Systems, vol. 31, Issue 8, Dec. 2006, pp. 733-769.
J. Payton et al., "Context-Sensitive Data Structures Supporting Software Development in Ad Hoc Mobile Settings", Proceedings of the 3rd International Workshop on Software Engineering for Large-Scale Multi-Agent Systems, co-located with ICSE 2004, May 2004, pp. 34-41.
U.S. Appl. No. 13/610,523 Non-Final Office Action Mailed Apr. 30, 2015.
U.S. Appl. No. 13/610,523 Notice of Allowance Mailed Oct. 9, 2015.
U.S. Appl. No. 13/621,931 Notice of Allowance Mailed Aug. 11, 2015.
U.S. Appl. No. 14/030,544 Final Office Action Mailed Dec. 1, 2015.
U.S. Appl. No. 14/030,544 Non-Final Office Action Mailed Jul. 8, 2015.

* cited by examiner

| INDUSTRY/FIELD | EVENT DESCRIBED BY EVENT DATA | NEW CONTEXTUAL STATE INFORMATION | BENEFICIAL TARGET DATA STORES |
|---|---|---|---|
| BANKING | BANK DEPOSIT/WITHDRAWAL | BANKING ACCOUNT REACHES NEXT TIER | 1. BANK TRAINING SCHEDULE<br>2. BANK BONUS ALLOCATION DATA<br>3. NATIONAL ECONOMIC FORECAST DATA |
| METEOROLOGY | WEATHER EVENT | UPDATED CURRENT WEATHER CONDITIONS | 1. WEATHER FORECAST DATA<br>2. BUILDING CONSTRUCTION SCHEDULE<br>3. AGRICULTURAL CROP PREDICTION DATA |
| MEDICINE | GENERATE MEDICAL TEST RESULTS | UPDATED MEDICAL RECORDS | 1. PATIENT'S DIAGNOSTIC DATA<br>2. PATIENT'S TREATMENT DATA<br>3. CLINICAL STUDIES DATA<br>4. INSURANCE FINANCIAL RESERVES DATA |
| MANUFACTURING | CHANGE IN MANUFACTURING ORDERS | UPDATED BACKLOG DATA | 1. MATERIAL ORDERING DATA<br>2. HIRING FORECAST DATA<br>3. POLITICAL FORECAST DATA |
| RESEARCH | NEW RESEARCH DISCOVERY | NEW MATERIAL DATA | 1. RESEARCH FUNDING ALGORITHM<br>2. ENVIRONMENTAL FORECAST DATA<br>3. ACTUARIAL TABLES |
| AGRICULTURE | REDUCED HARVEST OF PARTICULAR FOOD COMMODITY | SHORTAGE OF PARTICULAR FOOD COMMODITY | 1. COMMODITY FUTURES PRICING DATA<br>2. PREPARED FOOD PRICING DATA<br>3. PUBLIC HEALTH FORECAST DATA |

FIG. 3

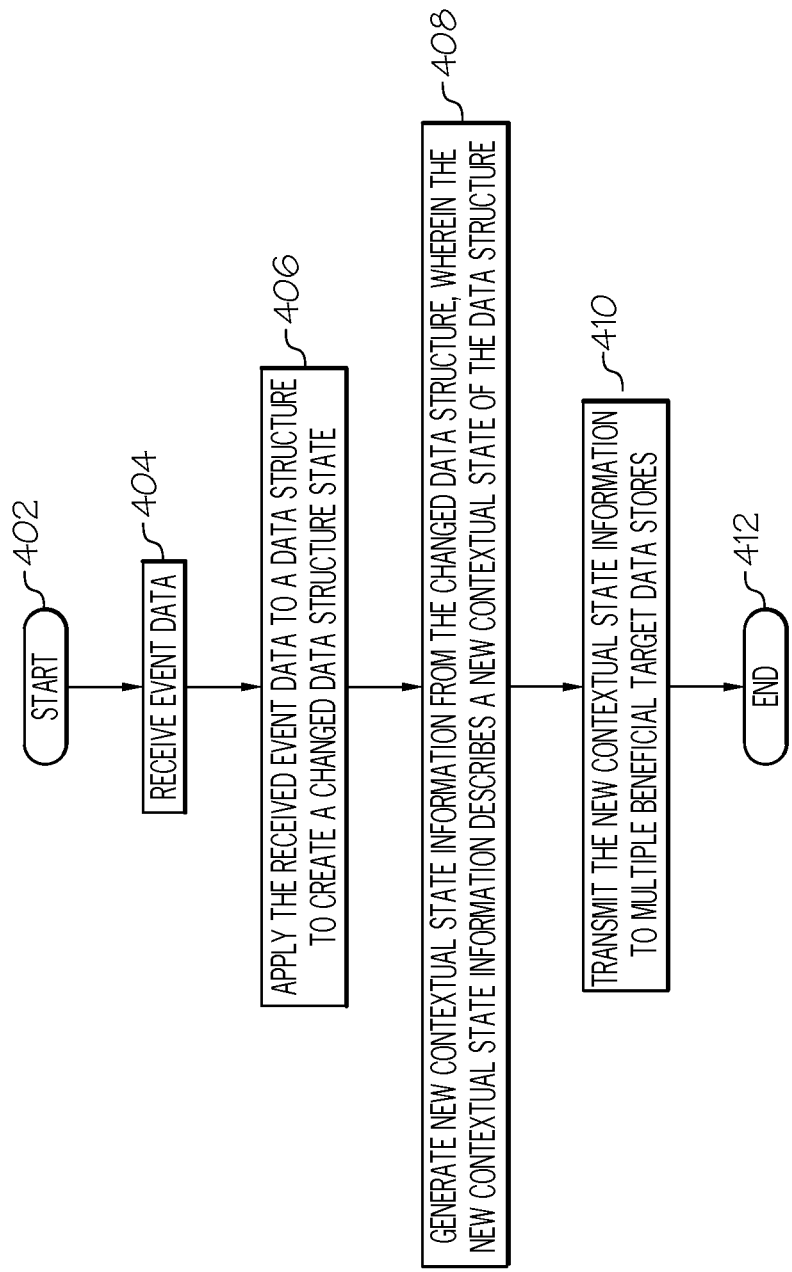

CONTEXTUAL STATE OF CHANGED DATA STRUCTURES

BACKGROUND

The present disclosure relates to the field of computers, and specifically to the use of data structures in computers. Still more particularly, the present disclosure relates to contextual states of changes to data structures.

A data structure is a software object, such as a database, a collection of software instructions, a table, etc. Data structures may be updated by event data, which include, but are not limited to, a description of a real-time event, a call from a software routine, an input to a table, etc. Thus, data structures provide a structure for data that describes and/or is modified by events.

SUMMARY

A method, system, and/or computer program product associates new contextual state information about a changed data structure with a beneficial target data. Event data, which describes an event that modifies a data structure, is incorporated into the data structure to create a changed data structure state. New contextual state information, which describes the changed data structure state, is generated and transmitted to multiple beneficial target data stores, wherein applying the new contextual state information to a particular beneficial target data affects an activity that utilizes the particular beneficial target data.

BRIEF DESCRIPTION OF THE SEVERAL VIEWS OF THE DRAWINGS

FIG. 3 illustrates an exemplary lookup table that associates event data with contextual state information, and contextual state information with beneficial target data stores, in accordance with one embodiment of the present invention;

FIG. 4 is a high-level flow chart of one or more steps performed by one or more processors to associate new contextual state information about a changed data structure with a beneficial target data.

DETAILED DESCRIPTION

Figure 1:
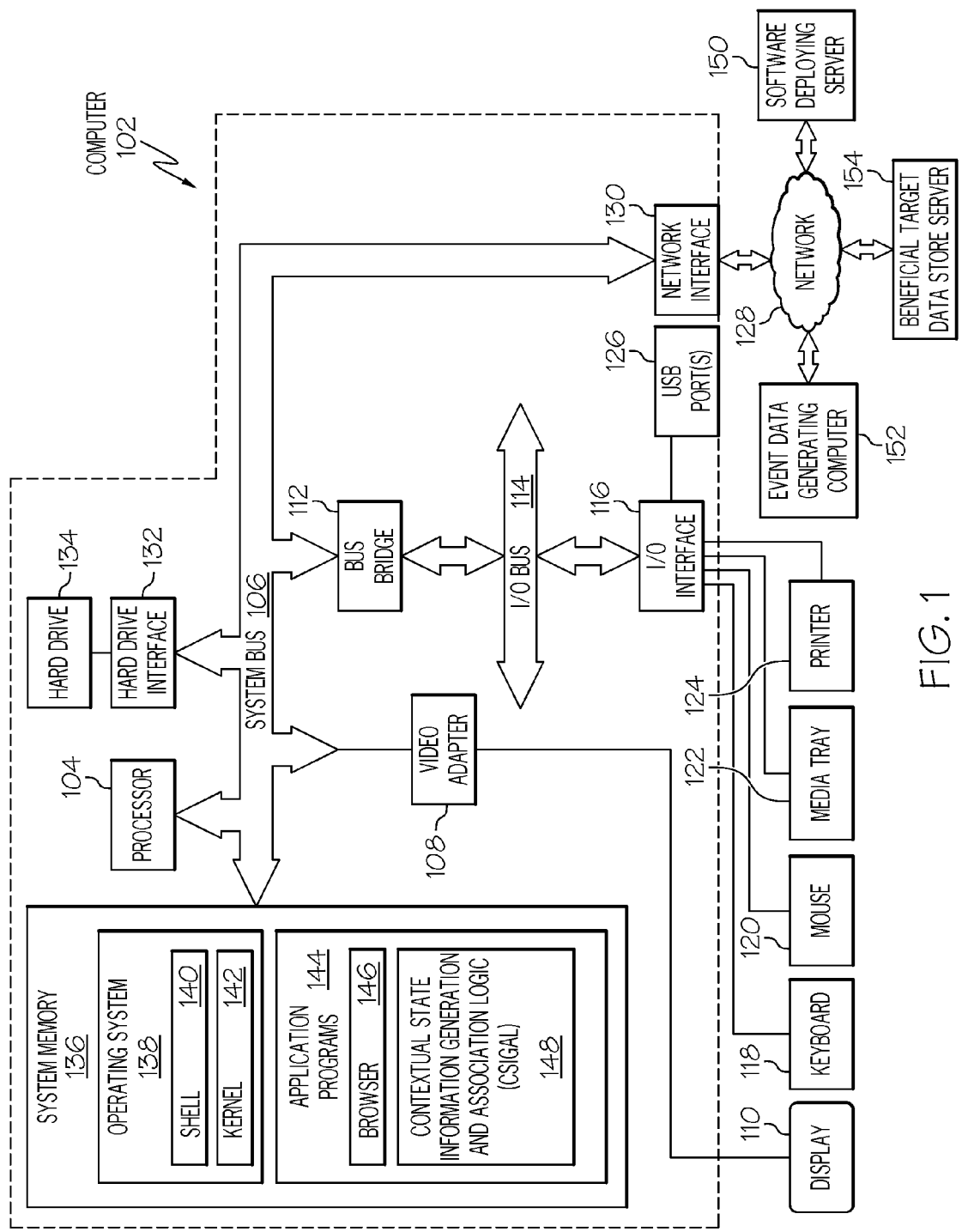
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150 and/or event data generating computer 152 and/or beneficial target data store server 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a contextual state information generation and association logic (CSIGAL) 148. CSIGAL 148 includes code for implementing the processes described below, including those described in FIGS. 2-5. In one embodiment, computer 102 is able to download CSIGAL 148 from software deploying server 150, including in an on-demand basis, wherein the code in CSIGAL 148 is not downloaded until needed for execution. Note further that, in one embodiment of the present invention, software deploying server 150 performs all of the functions associated with the present invention (including execution of CSIGAL 148), thus freeing computer 102 from having to use its own internal computing resources to execute CSIGAL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
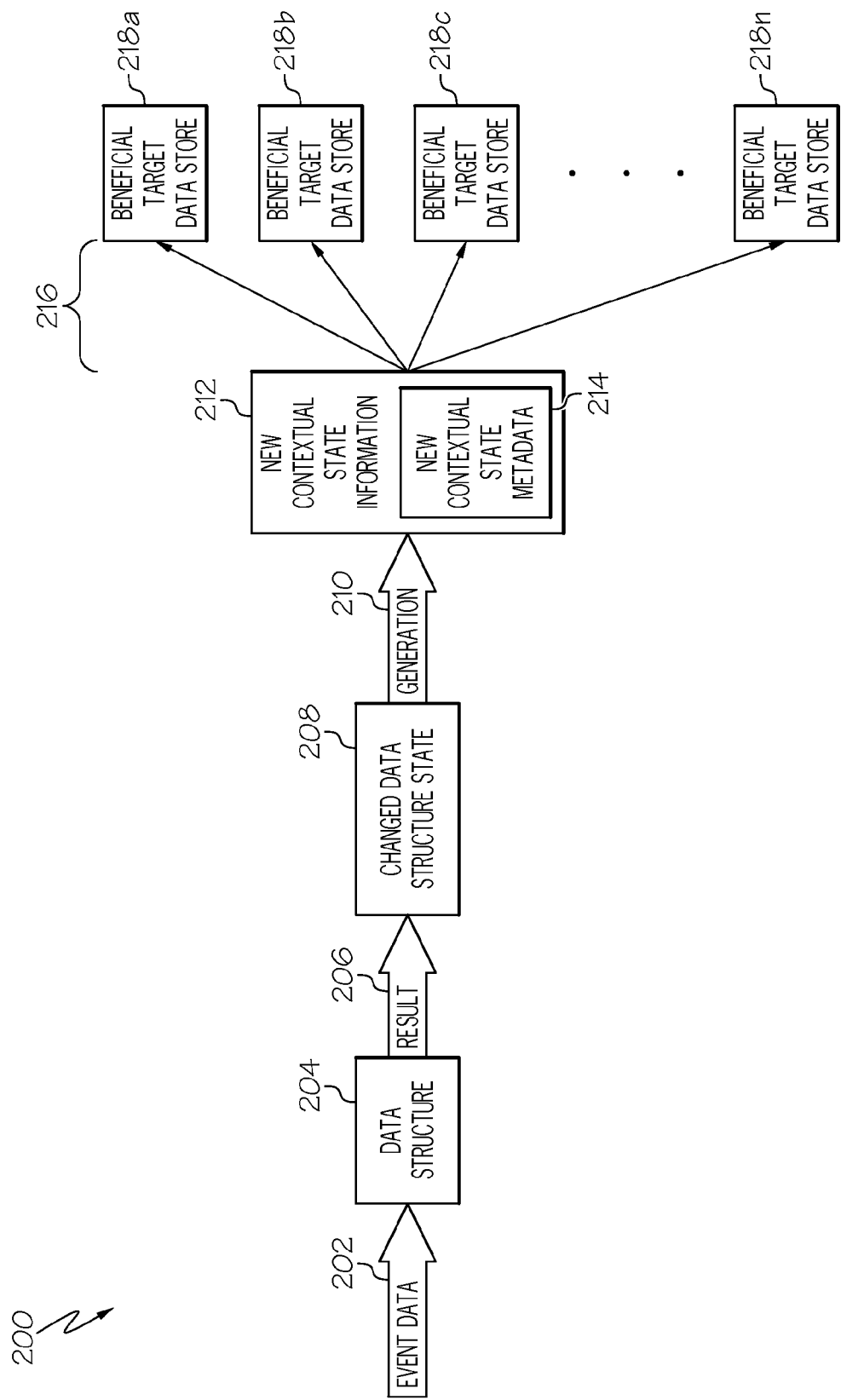
FIG. 2 is a block diagram of events that lead to an association of new contextual state information and/or new contextual state metadata with multiple beneficial target data stores, in accordance with one embodiment of the present invention.
Figure 5:
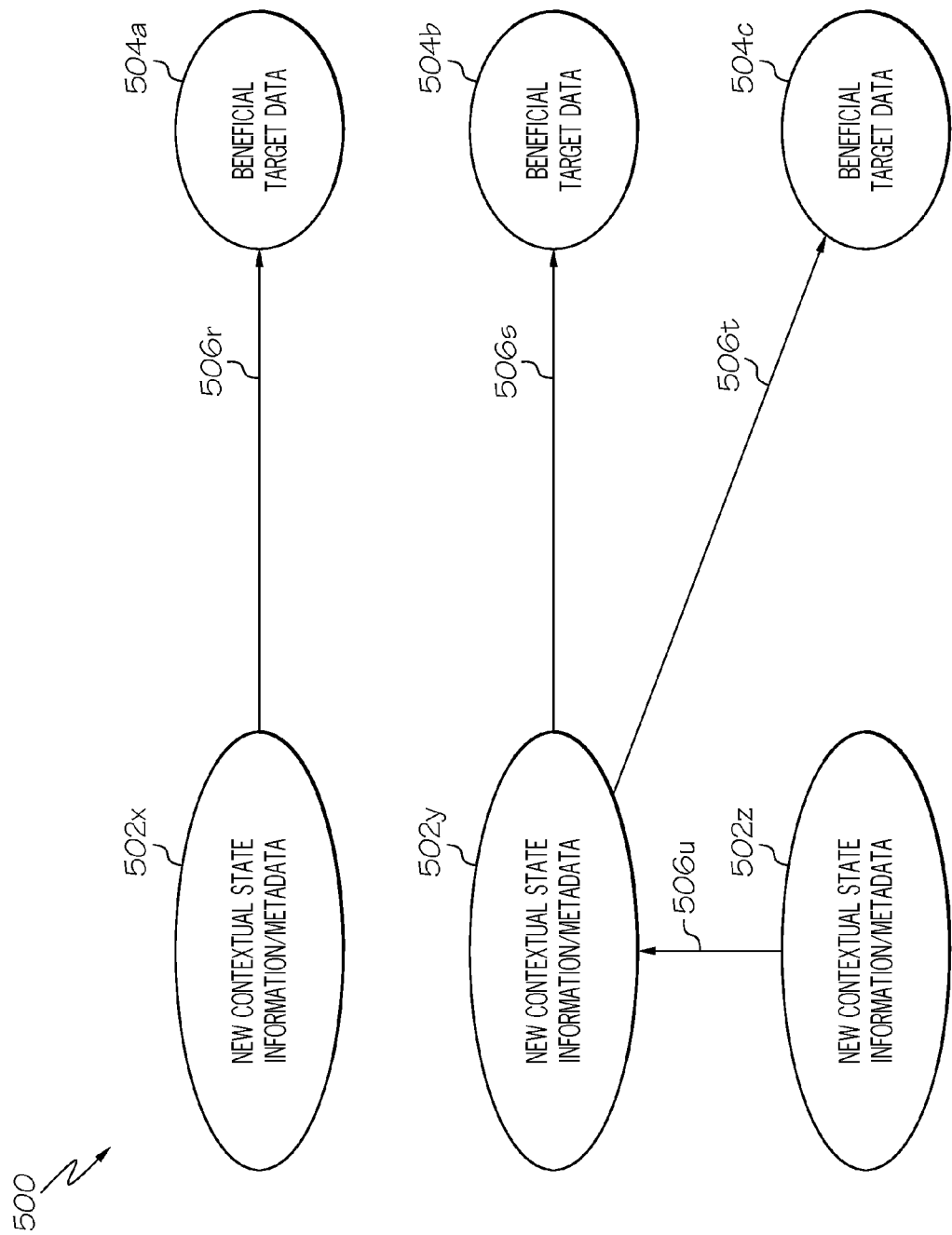
FIG. 5 depicts an exemplary graph data structure used to identify relationships among new contextual state information/metadata and beneficial target data.

With reference now to FIG. 2, a block diagram 200 of events that lead to an association of new contextual state information and/or new contextual state metadata with multiple beneficial target data stores, in accordance with one embodiment of the present invention, is presented.

Event data 202 (e.g., from an event data generating computer 152 shown in FIG. 1) is first incorporated into a data structure 204. As described in further detail herein, event data 202 describes an event that modifies data structure 204. This forms a result 206 of a changed data structure state 208. That is, the changed data structure state 208 describes a new condition of the data structure 204, rather than the data structure 204 itself. In one embodiment, the event data 202 is generated by a computer (e.g., event data generating computer 152) that monitors a particular set of initial activities (e.g., bank deposits being made, weather events occurring, etc.).

The changed data structure state 208 enables the generation 210 of new contextual state information 212 and/or new contextual state metadata 214. The new contextual state information 212 describes the changed data structure state 208, and the new contextual state metadata 214 describes the new contextual state information 212.

The new contextual state information 212 and/or new contextual state metadata 214 is then transmitted (via associations 216) to multiple beneficial target data stores 218a-218n (where "n" is an integer), where applying the new contextual state information 212 and/or new contextual state metadata 214 to a particular beneficial target data (from 218a-218n) affects an activity that utilizes that particular beneficial target data. The generation 210 of the new contextual state information 212 and/or new contextual state metadata 214, as well as the associations 216, may be performed/determined by reference to a rule set and/or a table of similar data structure. In one embodiment of the present invention, the multiple beneficial target data stores 218a-218n are stored in and/or are accessible from a beneficial target data store server, such as beneficial target data store server 154 depicted in FIG. 1.

Thus, with reference now to FIG. 3, an exemplary table 300 (which in one embodiment is a lookup table) that associates event data with contextual state information, and contextual state information with beneficial target data stores, is presented in accordance with one embodiment of the present invention. In one embodiment, some or all of the associations depicted in table 300 are made by compliance with one or more rules, as described in exemplary detail below. As depicted by table 300, the present invention may be incorporated into activities that are similar or unique for different industries/fields. The following embodiments are described with reference to both FIG. 3 and FIG. 2.

For example, consider an embodiment of the present invention that is utilized in the field of banking. An exemplary event may be that a customer makes a deposit of $1,000 into his bank account. This results in event data 202 of "$1,000", which is incorporated into the data structure 204 that describes her bank account. A result 206 of this deposit is that her bank account now has $100,000 as a current balance (as described by changed data structure state 208). This newly changed data structure state 208 enables the generation 210 (e.g., using software that uses information from the changed data structure state 208) of new contextual state information 212, which describes her bank account as now being at a next tier (e.g., at the "Platinum" level of accounts, as defined by that bank's rules/criteria). This newly generated new contextual state information 212 (e.g., "this account just reached the 'Platinum' level") is sent to multiple beneficial target data stores 218a-218n, which may be internal (i.e., are used by the bank with which this customer has her account), external (i.e., are used by other banks), or disparate (i.e., are used by non-banking enterprises). In one embodiment, the beneficial target data found in the beneficial target data stores 218a-218n affect an activity that utilizes the beneficial target data.

For example, consider a bank's training schedule. This training schedule utilizes a particular data and/or programming software to implement, monitor, and/or upgrade the bank's training schedule and its activities. The new contextual state information 212 describing the customer's account reaching "Platinum" status is received by the beneficial target data that is used to update/manage the bank's training schedule, either by implementation of a rule or by insertion of data/instructions into software (which is the beneficial target data).

For example, assume that software is monitoring a particular beneficial target data, which is related to the bank's training schedule, for incoming new contextual state information 212. Assume further that receipt of the new contextual state information 212 (by the particular beneficial target data) triggers a rule, which states "If an account reaches 'Platinum' status, then send an on-line training video, to the banker who is assigned to that account, regarding how to service 'Platinum' accounts." Thus, when the new contextual state information 212 is inserted into this beneficial target data, the monitoring software implements the associated rule and sends the training video to the responsible banker.

In another embodiment, however, the new contextual state information 212, and/or the new contextual state metadata 214 (e.g., a phrase/term such as "New Platinum Account", which describes the new contextual state information) is inserted directly into monitoring software, which has been programmed to respond to such data insertion by automatically sending the training video to the responsible banker. That is, in one embodiment the phrase/term "New Platinum Account" is actually a coded flag that, if present in a particular set of software (i.e., a particular beneficial target data), causes this particular set of software to automatically send the training video to the responsible banker.

Continuing with the banking embodiment/example described in FIG. 3, assume that the beneficial target data is related to a bank bonus allocation process (i.e., "activity"). Assume further, for exemplary purposes, that the new contextual state information 212 and/or new contextual state metadata 214 that describes the changed data structure state 208 is (or conveys the concept of) a "New Platinum Account". A transmission of this new contextual state information 212 and/or new contextual state metadata 214 to a beneficial target data in beneficial target data store 218a (which handles beneficial target data related to the bank bonus allocation process) causes a rule to be invoked and/or software to execute a process. That is, new contextual state information 212 and/or new contextual state metadata 214 indicative of the "New Platinum Account" may 1) causes monitoring software to invoke a rule, which results in the responsible banker receiving a bonus payment, and/or 2) result in software using the input "New Platinum Account" (e.g., a coded flag) to send the responsible banker her bonus payment.

In one embodiment, the industry/field in which the initial event occurred is different (i.e., disparate, dissimilar, etc.) from an industry/field that is able to benefit from the resulting new contextual state information 212 and/or new contextual state metadata 214. For example, consider an embodiment in which a particular beneficial target data affects the activity of forecasting the national economy. That is, forecasting activities rely, in whole or in part, on the data found in that particular beneficial target data. When new contextual state information 212 and/or new contextual state metadata 214 is incorporated into this particular beneficial target data (in order to invoke a rule and/or to cause a certain software application output, as described above), then the activity of forecasting the nation's economy is affected. Thus, new contextual state information 212 and/or new contextual state metadata 214 related to "New Platinum Account" (and ultimately, the account deposit that initiated the event and event data 202) will automatically affect this economic forecast, either directly (as an input to a forecasting software program) or indirectly (by invoking a rule).

Consider now an embodiment of the present invention in which an event from the field of meteorology (i.e., weather forecasting) affects an activity that utilizes a particular beneficial target data, as also described in FIG. 3. Assume that the event that prompted the generation of event data 202 is a weather event, such as a hurricane. This results (206) in a changed data structure state 208 to data structure 204, which is a record of rainfall amounts. The changed data structure state 208 enables the generation (210) of new contextual state information 212 and/or new contextual state metadata 214, which describes the updated record of rainfall amounts, such as "Flooding". That is, "Flooding" is a contextual state and/or metadata that describe the updated record of rainfall amounts. In a similar process as that described above (i.e., where a rule is invoked and/or a software program receives an input to generate an output), new contextual state information 212 and/or new contextual state metadata 214, which describes the weather event and/or updated record of rainfall amounts, changes a weather forecast data. This weather forecast data is a beneficial target data that is used when making forecasts. As described herein, the beneficial target data is either a set of reference data or an executable software program, either of which affect the activity of predicting the weather. Similarly, the new contextual state information 212 and/or new contextual state metadata 214 that describes the weather event may be utilized by activities other than weather prediction, such as managing a construction schedule for a new building, predicting agricultural crop output, etc.

Consider now an embodiment of the present invention in which an event from the field of medicine affects an activity that utilizes a particular beneficial target data, as also described in FIG. 3. Assume that the event that prompted the generation of event data 202 is a particular set of medical test results being generated for one or more patients. Examples of such medical test results are levels of metabolites in bodily fluids, presence/absence of pathogens in a patient, identification of abnormalities to structures/organs (or normalcy thereof) in patients, etc. The event ultimately results in a changed data structure state 208 (e.g., state of medical records), which enables the generation of new contextual state information 212 and/or new contextual state metadata 214 that describes the updated medical records, which include data about medical test results. In a similar process as that described above (i.e., where a rule is invoked and/or a software program receives an input to generate an output), new contextual state information 212 and/or new contextual state metadata 214, which relates to the medical test results, changes the beneficial target diagnostic data that is used in the activity of diagnosing diseases of one or more patients. As described herein, the beneficial target diagnostic data is either a set of reference data or an executable software program, either of which affect the activity of making medical diagnoses. Similarly, the new contextual state information 212 and/or new contextual state metadata 214 that relates to the medical test results may be utilized by beneficial target data used in establishing a plan of medical treatment for one or more patients. Similarly, new contextual state information 212 and/or new contextual state metadata 214 that relates to the medical test results may be utilized to update activities in a medical study related to the medical test results.

Note that the new contextual state information 212 and/or new contextual state metadata 214 that relate to the medical test results in FIG. 3 may be utilized in a non-medical context. For example, new contextual state information 212 and/or new contextual state metadata 214 that relates to the medical test results may be utilized when setting financial reserves with an insurance company. That is, new contextual state information 212 and/or new contextual state metadata 214 that relates to the medical test results may invoke a rule in software, which monitors the beneficial target data (used when setting financial reserves), to increase financial reserves for a particular patient/set of patients having a certain disease. Similarly, new contextual state information 212 and/or new contextual state metadata 214 that relates to the medical test results may be utilized (e.g., as a coded flag) in software that automatically sets financial reserves for a particular claim file, set of related claims for a similar disease, etc.

Consider now an embodiment of the present invention in which an event from the field of manufacturing affects an activity that utilizes a particular beneficial target data, as also described in FIG. 3. Assume that the event that prompted the generation of event data 202 is an increase or decrease in manufacturing orders (i.e., new orders coming in or old orders being cancelled). As a result (206) of these changes in manufacturing orders, a changed data structure state 208 of a data structure 204 (e.g., order backlog records) results, which enables the generation (210) of new contextual state information 212 and/or new contextual state metadata 214 that describes the "Updated Backlog Data". Examples of such new contextual state information 212 and/or new contextual state metadata 214 include, but are not limited to, descriptive terms such as "Six-month Backlog", "Inadequate Backlog" (as defined by rules/guidelines that have been set by the manufacturer), etc. In a similar process as that described above (i.e., where a rule is invoked and/or a software program receives an input to generate an output), new contextual state information 212 and/or new contextual state metadata 214 that describes the "Updated Backlog Data" changes the beneficial target data that is used in ordering raw materials used in manufacturing. As described herein, the beneficial target data is either a set of reference data or an executable software program, either of which affect the activity of ordering raw materials. Similarly, the new contextual state information 212 and/or new contextual state metadata 214 that describes the "Updated Backlog Data" may be utilized by beneficial target data used in establishing and/or executing a plan for hiring additional workers.

Note that the new contextual state information 212 and/or new contextual state metadata 214 that describes the "Updated Backlog Data" may be utilized in a non-manufacturing context. For example, new contextual state information 212 and/or new contextual state metadata 214 that describes the "Updated Backlog Data" may be utilized when forecasting a politician's electability. That is, many election contests are based on economic conditions at the time of the election. Thus, new contextual state information 212 and/or new contextual state metadata 214 that describes the "Updated Backlog Data" may invoke a rule in software that monitors the beneficial target data (used when predicting economic conditions, and thus political viability) to adjust a prediction of voter polls for a particular politician. Similarly, new contextual state information 212 and/or new contextual state metadata 214 that describes the "Updated Backlog Data" may be utilized (e.g., as a coded flag) in software that automatically creates political polling projections.

Consider now an embodiment of the present invention in which an event from the field of research affects an activity that utilizes a particular beneficial target data, as also described in FIG. 3. Research is defined as the field of systematically increasing knowledge about a particular subject, through the study of known information in order to extrapolate new knowledge, and/or by observation of previously unobserved/unstudied objects and/or processes. Assume that the event that prompted the generation of event data 202 is a new research discovery (e.g., the discovery of a new type of material). Due to this discovery, a changed data structure state 208 (e.g., an updated list of known materials) results, which enables the generation of new contextual state information 212 and/or new contextual state metadata 214 that describes the newly discovered material. An example of such new contextual state information 212 and/or new contextual state metadata 214 is "New Material". In a similar process as that described above (i.e., where a rule is invoked and/or a software program receives an input to generate an output), new contextual state information 212 and/or new contextual state metadata 214 that describes the newly discovered material changes the beneficial target data that is used in funding research projects. As described herein, the beneficial target data is either a set of reference data or an executable software program, either of which affect the activity of funding research.

Note that the new contextual state information 212 and/or new contextual state metadata 214 that describes the newly discovered material may be utilized in a non-research context. For example, new contextual state information 212 and/or new contextual state metadata 214 that describes the newly discovered material may be utilized when forecasting the future of the environment (pollution, climate, etc.). That is, environmental changes may be caused by a research breakthrough in which a new material is able to reduce pollution, lower greenhouse effects, etc. Thus, new contextual state information 212 and/or new contextual state metadata 214 that describes the newly discovered material may invoke a rule in software that monitors the beneficial target data (used when predicting environmental changes) to adjust a prediction of changes to the environment. Similarly, new contextual state information 212 and/or new contextual state metadata 214 that describes the newly discovered material may be utilized (e.g., as a coded flag) in software that automatically creates environmental predictions.

Consider now an embodiment of the present invention in which an event from the field of agriculture affects an activity that utilizes a particular beneficial target data, as also described in FIG. 3. Assume that the event that prompted the generation of event data 202 is a poor crop harvest (i.e., the harvest of a particular crop such as corn is well below average). As a result of this poor crop harvest, a changed data structure state 208 (e.g., an updated corn tonnage list of how much corn is in silos) results, which enables the generation of new contextual state information 212 and/or new contextual state metadata 214 that describes the poor crop harvest. Examples of such new contextual state information 212 and/or new contextual state metadata 214 include, but are not limited to, "Reduced Corn Harvest", "5,000 tons", etc. In a similar process as that described above (i.e., where a rule is invoked and/or a software program receives an input to generate an output), new contextual state information 212 and/or new contextual state metadata 214 that describes the poor crop harvest changes the beneficial target data that is used in adjusting prices on the commodity futures market. As described herein, the beneficial target data is either a set of reference data or an executable software program, either of which affect the pricing of commodity futures (i.e., speculations on the future prices of a particular commodity).

Note that the new contextual state information 212 and/or new contextual state metadata 214 that describes the poor crop harvest may be utilized in a non-agricultural context, such as grocery retailing, food services such as restaurant management, etc. For example, new contextual state information 212 and/or new contextual state metadata 214 that describes the updated corn tonnage may be utilized when setting a price for prepared food (e.g., packaged food sold in a grocery store, freshly-prepared food served in a restaurant, etc.). Thus, new contextual state information 212 and/or new contextual state metadata 214 that describes the updated corn tonnage may invoke a rule in software that monitors the beneficial target data (used to set prepared food prices) to adjust these prepared food prices. Similarly, new contextual state information 212 and/or new contextual state metadata 214 that describes the updated corn tonnage may be utilized (e.g., as a coded flag) in software that automatically sets the current price of prepared food.

Similarly, new contextual state information 212 and/or new contextual state metadata 214 that describes the updated corn tonnage may be utilized when making predictions about public health. For example, lower corn output may result in lower high-fructose corn syrup production, thus driving up the cost of candy, and thus driving down levels of obesity, diabetes, etc. due to decreased demand. Alternatively, lower corn output may drive up the cost of all foods, including feedstock such as livestock feed, thus resulting in higher food prices and higher malnutrition rates (e.g., due to increased beef prices caused by the more expensive feedstock). Thus, new contextual state information 212 and/or new contextual state metadata 214 that describes the updated corn tonnage may invoke a rule in software that monitors the beneficial target data (used to predict public health conditions) to adjust these predictions. Similarly, new contextual state information 212 and/or new contextual state metadata 214 that describes the updated corn tonnage may be utilized (e.g., as a coded flag) in software that automatically generates public health forecasts.

As depicted in FIG. 2, new contextual state information 212 and/or new contextual state metadata 214 is associated with multiple beneficial target data found in the beneficial target data stores 218a-218n. In one embodiment, determining which beneficial target data is to be associated with the new contextual state information 212 and/or new contextual state metadata 214 is set by probabilistic impact data. Probabilistic impact data is defined as data that describes a predicted impact level that new contextual state information 212 and/or new contextual state metadata 214 will have on beneficial target data.

For example, assume that new contextual state information 212 and/or new contextual state metadata 214 describes a banking account's tier level (e.g., "New Platinum Account"). Information that describes this "New Platinum Account" will have a 100% impact on beneficial target data that is used to identify all "Platinum Accounts" in that bank. That is, "New Platinum Account" has a 100% probability of enabling/affecting activities related to identifying "Platinum Accounts" in that bank. However, this same new contextual state information 212 and/or new contextual state metadata 214 that describes this "New Platinum Account" will have (for example) only a 60% impact on beneficial target data that is used to identify the overall financial health of this bank. That is, "New Platinum Account" will have only a 60% likelihood of enabling/affecting the process of identifying the overall financial health of this bank.

Furthermore, the new contextual state information 212 and/or new contextual state metadata 214 that describes a "New Platinum Account" may have a negative impact on beneficial target data. For example, information that describes this "New Platinum Account" will have a 100% negative impact on preventing beneficial target data that is used to prove that no new account levels have been reached, since the description of a "New Platinum Account" makes the proof of no new account levels impossible. That is, if a particular beneficial target data receives "New Platinum Account", then there is a 100% certainty that proving that there are no new account levels cannot occur.

Furthermore, new contextual state information 212 and/or new contextual state metadata 214 that describes the "New Platinum Account" may have 0% impact on data used to identify "Closed Accounts" in that bank, since "New Platinum Accounts" have nothing to do with "Closed Accounts".

This probabilistic impact data (between +1.0 (i.e., +100%) and −1.0 (i.e., −100%)) may be set by an explicit or implicit rule set, a table, by Bayesian analytics, and/or by statistical formulations/techniques. For example, a rule may state that if the new contextual state information 212 and/or new contextual state metadata 214 contain a term such as "account", then there is a 50% chance that it will have a 90% positive impact on activities that use a beneficial target data that has the term "amount".

In one embodiment, a Bayesian analysis is used to establish a probabilistic impact datum. This Bayesian analysis utilizes the formula:

$$P(A \mid B) = \frac{P(B \mid A) \times P(A)}{P(B)}$$

where:
P(A|B) is the probability that the particular new contextual state information 212 and/or new contextual state metadata 214 (e.g., which contains the term "account"), has a 90% positive impact on activities that use a particular beneficial target data (A) given that (I) the particular beneficial target data contains the term "amount" (B);
P(B|A) is the probability that the particular beneficial target data contains the term "amount" (B) given that (I) the particular new contextual state information 212 and/or new contextual state metadata 214 actually have a 90% positive impact on activities that use a particular beneficial target data (A);
P(A) is the probability that the particular new contextual state information 212 and/or new contextual state metadata 214 has a 90% positive impact on activities that use a particular beneficial target data regardless of any other information; and
P(B) is the probability that the particular beneficial target data contains the term "amount" regardless of any other information.

Thus, if P(B|A)=70%, P(A)=80%, and P(B)=90%:

$$P(A \mid B) = \frac{(.70)(.80)}{(.90)} = .62$$

then P(A|B)=0.62, and thus, the probabilistic impact datum is 62%.

In one embodiment of the present invention, the probabilistic impact data and/or new contextual state information 212 and/or new contextual state metadata 214 have a provenance. The term "provenance" is defined as a recorded trail of the life of an object, from its original creation to its current position/usage, and may include all intervening locations/users that have used and/or modified the object.

Thus, in one embodiment of the present invention, the provenance is established for probabilistic impact data. For example, assume that a particular new probabilistic impact data was named NPID', had a probability value of 50%, and was created by program P on date D. Assume further that NPID' was later adjusted by program PP on date DD, to become NPID". A record of where, when, and by what/whom the various versions of NPID were created/modified is stored in a probabilistic provenance audit trail, which may be a single path, a tree network, a graph structure, etc.

Furthermore, in one embodiment of the present invention, the provenance is established for new contextual state information (e.g., element 212 shown in FIG. 2). For example, assume that a particular new contextual state information was initially named NCSI', and was created by program P on date D. Assume further that NCSI' was later modified by program PP on date DD, to become NCSI". Assume further that NCSI' was 1) sent to beneficial target data store 218*a* on date DY, where records (e.g., data that maps particular activities to particular data stores) mapped to a particular event E indicate that 2) NCSI' had no impact/effect on activity A. However, when NCSI" was 1) sent to beneficial target data store 218*a* on date DZ, mapped records indicate that 2) NCSI" caused activity A to be altered. All of this data is included in a state provenance audit trail for NCSI'/NCSI". Note that this state provenance audit trail is not just a set of time stamps and modification flags, but rather includes information about how new contextual state information 1) is modified, 2) is used, and 3) affects various activities that utilize the beneficial target data described herein. A record of where, when, how, and for what/whom the various versions of NCSI affected certain activities is stored in a probabilistic provenance audit trail, which may be a single path, a tree network, a graph structure, etc.

With reference now to FIG. 4, a high-level flow chart of one or more steps performed by one or more processors to associate new contextual state information about a changed data structure with a beneficial target data is presented. After initiator block 402, which may be initiated by a particular event, event data that describes that particular event is received (block 404). This event data describes an event that modifies a data structure, such as described in exemplary detail above in FIGS. 2-3. The event data is then incorporated into the data structure to create a changed data structure state (block 406), as described by elements 204-208 in FIG. 2.

As described in block 408, new contextual state information about the changed data structure state is then generated. This new contextual state information describes the changed data structure state (e.g., provides a new description of a bank account as being a "Platinum Account"). As described in block 410, the new contextual state information is then transmitted (e.g., by one or more processors via an electronic communication pathway) to multiple beneficial target data stores. As described herein, applying the new contextual state information to a particular beneficial target data affects an activity that utilizes the particular beneficial target data. The process ends at terminator block 412.

As described above, the event data (e.g., element 202 in FIG. 2) is generated in response to an actual event (e.g., the deposit of money into a bank account). However, in one embodiment of the present invention, the event data is generated in response to a non-event. For example, assume that a bank customer routinely deposits $100 into her account every Friday, and has done so for the past 100 weeks without fail. If this bank customer fails to make her usual $100 Friday deposit for a week or two, this will be deemed (e.g., by a rule found in a monitoring software program) to be a non-event, which affects the normal status of the data structure 202, which ultimately affects the generation of the new contextual state information 212 and/or the new contextual state metadata 214 shown in FIG. 2.

In one embodiment of the present invention, and as discussed above with reference to element 214 in FIG. 2, contextual state metadata that describes the new contextual state information is generated and then transmitted (e.g., by one or more processors via the electronic communication pathway) to the multiple beneficial target data stores.

In one embodiment of the present invention, a determination (i.e., creation) of a probabilistic impact data associated with the new contextual state information and a specific activity that utilizes a specific beneficial target data is made. This probabilistic impact data describes a probability of the new contextual state information affecting the specific activity that utilizes the specific beneficial target data. In one embodiment, in response to the probabilistic impact data having a value that is absolutely less than a predetermined value, the transmission of the new contextual state information to the specific beneficial target data is blocked. In one embodiment of the present invention, a determination of a probability provenance of the probabilistic impact data is made, where the probability provenance describes a source and subsequent modification of the probabilistic impact data.

In one embodiment of the present invention, the new contextual state information is associated with the multiple beneficial target data stores according to a rule set for associating the contextual information with one or more beneficial target data. In another embodiment, the new contextual state information is associated with the multiple beneficial target data stores according to a lookup table for associating the contextual information with one or more beneficial target data.

In one embodiment of the present invention, each beneficial target data store contains beneficial target data associated with disparate industries (e.g., as depicted in FIG. 3).

In one embodiment of the present invention, the event data describes a non-event, where the non-event describes a non-occurrence of an expected event.

In one embodiment of the present invention, the event data is a first input to a first software application program, the new contextual state information is a second input to a second software application program, and a particular beneficial target data is the second software application program. For example, in FIG. 2 the event data 202 may be a data input (e.g., "$100") to a first software application program (i.e., where data structure 204 in FIG. 2 is actually an application program). This results in the generation of the new contextual state information 212 and/or new contextual state metadata 214, either or both of which may be a data input (e.g., "Value X") into a second software application (where a beneficial target data, such as that found in beneficial target data store 218a in FIG. 2, is actually a software application).

In one embodiment of the present invention, one or more processors sort the multiple beneficial target data stores into different commercial activity fields, such as those depicted in FIG. 3.

In one embodiment of the present invention, a graph data structure is used to identify relationships among new contextual state information/metadata and beneficial target data. A graph data structure consists of multiple nodes, each of which contain data, and whose relationships are described by edges (e.g., pointers) between the nodes. For example, in the graph data structure 500 depicted in FIG. 5, new contextual state nodes 502x-502z contain data found in new contextual state information 212 and/or the new contextual state metadata 214 (depicted in FIG. 2). Beneficial target data nodes 504a-504c contain beneficial target data found in beneficial target data stores 218a-218c shown in FIG. 2. Thus, edge 506r describes the relationship, caused by implementation of a rule, entries in a lookup table, etc., between a particular new contextual state information 212 and/or the new contextual state metadata 214 (contained within a new contextual state node 502x) and beneficial target data 504a. Similarly, edge 506s describes the relationship, caused by implementation of a rule, entries in a lookup table, etc., between a different particular new contextual state information 212 and/or the new contextual state metadata 214 (contained within a new contextual state node 502y) and beneficial target data 504b, while edge 506t describes the relationship, caused by implementation of a rule, entries in a lookup table, etc., between new contextual state information in new contextual state node 502y and beneficial target data 504c.

Similarly, edge 506u describes the relationship between new contextual state node 502z and new contextual state node 502y. For example, the new contextual state information 212 and/or the new contextual state metadata 214 found in these respective new contextual state nodes 502y/502z may be related according to a lookup table, rule, etc., that identifies them as both pertaining to the same field, such agriculture, manufacturing, etc.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
receiving, by one or more processors, event data, wherein the event data describes an event that modifies a data structure, wherein the event is a meteorological event, and wherein the event data comprises a rainfall amount from the meteorological event;
incorporating, by the one or more processors, the event data into the data structure to create a changed data structure state;
generating, by the one or more processors, new contextual state information about the changed data structure state, wherein the new contextual state information describes the changed data structure state, and wherein the changed data structure state affects construction of a new building;
transmitting, by the one or more processors via an electronic communication pathway, the new contextual state information to multiple beneficial target data stores, wherein each of the multiple beneficial target data stores contains executable software programs;
applying, by the one or more processors, the new contextual state information to a particular beneficial target data that affects an activity that utilizes the particular beneficial target data, wherein the particular beneficial target data is an executable software program;
determining, by the one or more processors, a probabilistic impact data associated with the new contextual state information and a specific activity that utilizes a specific executable software program that is stored in a specific beneficial target data store, wherein the probabilistic impact data describes a probability of the new contextual state information affecting the specific activity that utilizes the specific executable software program, and wherein the specific activity is the construction of the new building;
in response to the probabilistic impact data having a value that is less than a predetermined value, blocking, by the one or more processors, the transmission of the new contextual state information to the specific beneficial target data store;
in response to the probabilistic impact data having a value that is greater than the predetermined value:
transmitting, by one or more processors, the new contextual state information to the specific executable software program that is stored in the specific beneficial target data store;
generating a revised construction schedule for the new building based on the new contextual state information; and
adjusting, by the one or more processors, the construction of the new building based on the new contextual state information and the revised construction schedule for the new building.

2. The method of claim 1, further comprising:
generating, by the one or more processors, contextual state metadata that describes the new contextual state information; and
transmitting, by the one or more processors via the electronic communication pathway, the contextual state metadata to the multiple beneficial target data stores.

3. The method of claim 1, further comprising:
determining, by the one or more processors, a probability provenance of the probabilistic impact data, wherein the probability provenance describes a source and subsequent modification of the probabilistic impact data.

4. The method of claim 1, further comprising:
associating, by the one or more processors, the new contextual state information with the multiple beneficial target data stores according to a rule set for associating the new contextual state information with one or more beneficial target data.

5. The method of claim 1, further comprising:
associating, by the one or more processors, the new contextual state information with the multiple beneficial target data stores according to a lookup table for associating the new contextual state information with one or more beneficial target data.

6. The method of claim 1, wherein each beneficial target data store contains beneficial target data associated with disparate industries.

7. The method of claim 1, wherein the event data describes a non-event, and wherein the non-event describes a non-occurrence of an expected event.

8. The method of claim 1, wherein the event data is a first input to a first software application program, wherein the new contextual state information is a second input to a second software application program, and wherein the particular beneficial target data is the second software application program.

9. The method of claim 1, further comprising:
sorting, by the one or more processors, the multiple beneficial target data stores into different activity fields.

10. A computer program product comprising a non-transitory computer readable storage medium having program code embodied therewith, the program code readable and executable by a processor to perform a method comprising:
receiving event data, wherein the event data describes an event that modifies a data structure, wherein the event is a meteorological event, and wherein the event data comprises a rainfall amount from the meteorological event;
incorporating the event data into the data structure to create a changed data structure state;
generating new contextual state information about the changed data structure state, wherein the new contextual state information describes the changed data structure state, and wherein the changed data structure affects construction of a new building;

transmitting the new contextual state information to multiple beneficial target data stores, wherein each of the multiple beneficial target data stores contains executable software programs;

applying the new contextual state information to a particular beneficial target data that affects an activity that utilizes the particular beneficial target data, wherein the particular beneficial target data is an executable software program;

determining a probabilistic impact data associated with the new contextual state information and a specific activity that utilizes a specific executable software program that is stored in a specific beneficial target data store, wherein the probabilistic impact data describes a probability of the new contextual state information affecting the specific activity that utilizes the specific executable software program, and wherein the specific activity is the construction of the new building;

in response to the probabilistic impact data having a value that is less than a predetermined value, blocking the transmission of the new contextual state information to the specific beneficial target data store;

in response to the probabilistic impact data having a value that is greater than the predetermined value:
 transmitting the new contextual state information to the specific executable software program that is stored in the specific beneficial target data store;
 generating a revised construction schedule for the new building based on the new contextual state information; and
 adjusting the construction of the new building based on the new contextual state information and the revised construction schedule for the new building.

11. The computer program product of claim 10, wherein the method further comprises:
generating contextual state metadata that describes the new contextual state information; and
transmitting the contextual state metadata to the multiple beneficial target data stores.

12. The computer program product of claim 10, wherein the method further comprises:
associating the new contextual state information with the multiple beneficial target data stores according to a rule set for associating the new contextual state information with one or more beneficial target data.

13. The computer program product of claim 10, wherein the event data is an input to a first software application program, and wherein the particular beneficial target data is a second software application program.

14. A computer system comprising:
a processor, a computer readable memory, and a computer readable storage medium;
first program instructions to receive event data, wherein the event data describes an event that modifies a data structure, wherein the event is a meteorological event, and wherein the event data comprises a rainfall amount from the meteorological event;
second program instructions to incorporate the event data into the data structure to create a changed data structure state;

third program instructions to generate new contextual state information about the changed data structure state, wherein the new contextual state information describes the changed data structure state, and wherein the changed data structure state affects construction of a new building;

fourth program instructions to transmit the new contextual state information to multiple beneficial target data stores, wherein each of the multiple beneficial target data stores contains executable software programs;

fifth program instructions to apply the new contextual state information to a particular beneficial target data that affects an activity that utilizes the particular beneficial target data, wherein the particular beneficial target data is an executable software program;

sixth program instructions to determine a probabilistic impact data associated with the new contextual state information and a specific activity that utilizes a specific executable software program that is stored in a specific beneficial target data store, wherein the probabilistic impact data describes a probability of the new contextual state information affecting the specific activity that utilizes the specific executable software program, and wherein the specific activity is the construction of the new building;

seventh program instructions to, in response to the probabilistic impact data having a value that is less than a predetermined value, block the transmission of the new contextual state information to the specific beneficial target data store;

eighth program instructions to, in response to the probabilistic impact data having a value that is greater than the predetermined value:
 transmit the new contextual state information to the specific executable software program that is stored in the specific beneficial target data store;
 generate a revised construction schedule for the new building based on the new contextual state information; and
 the construction of the new building based on the new contextual state information and the revised construction schedule for the new building; and wherein the first, second, third, fourth, fifth, sixth, seventh, and eighth program instructions are stored on the computer readable storage medium for execution by the processor via the computer readable memory.

15. The computer system of claim 14, further comprising:
ninth program instructions to associate the new contextual state information with the multiple beneficial target data stores according to a rule set for associating the new contextual state information with one or more beneficial target data; and
wherein the ninth program instructions are stored on the computer readable storage medium for execution by the processor via the computer readable memory.

16. The computer system of claim 14, wherein the event data is an input to a first software application program, and wherein the particular beneficial target data is a second software application program.

* * * * *